United States Patent

Kikuchi

[11] Patent Number: 5,835,318
[45] Date of Patent: Nov. 10, 1998

[54] DISK CARTRIDGE WITH SHUTTER AND STOCK ROLL THEREFOR

[75] Inventor: Shuichi Kikuchi, Miyagi, Japan

[73] Assignee: Sony Corporation, Tokyo, Japan

[21] Appl. No.: 598,536

[22] Filed: Feb. 8, 1996

[30] Foreign Application Priority Data

Feb. 14, 1995 [JP] Japan .................................. 7-024884

[51] Int. Cl.⁶ .......................... G11B 23/03; B32B 15/04
[52] U.S. Cl. ......................... 360/133; 369/291; 148/537; 428/467
[58] Field of Search .................... 360/133, 132; 369/289, 290, 191; 148/537; 428/457, 458, 467, 121, 122, 484

[56] References Cited

U.S. PATENT DOCUMENTS

| | | | |
|---|---|---|---|
| 5,293,294 | 3/1994 | Chappell | 360/133 |
| 5,308,709 | 5/1994 | Ogino et al. | 428/623 |
| 5,512,111 | 4/1996 | Tahara et al. | 360/106 |
| 5,527,606 | 6/1996 | Kikuchi | 369/291 |

FOREIGN PATENT DOCUMENTS

| | | |
|---|---|---|
| A-0 459 743 | 12/1991 | European Pat. Off. . |
| A-0 497 560 | 8/1992 | European Pat. Off. . |
| A-0 524 824 | 1/1993 | European Pat. Off. . |
| A-0 579 943 | 1/1994 | European Pat. Off. . |
| 0 609 150 | 8/1994 | European Pat. Off. . |

OTHER PUBLICATIONS

Patent Abstracts of Japan, vol. 016, No. 491 (p-1434), Oct. 12, 1992, & JP-A-04 176070 (Mitsubishi Materials Corp). Jun. 23, 1992.

Patent Abstracts of Japan, vol. 014, No. 064 (p-1002), Feb. 6, 1990 & JP-A-01 286190 (Canon Inc.), Nov. 17, 1989.

*Primary Examiner*—Stuart S. Levy
*Assistant Examiner*—David L. Ometz
*Attorney, Agent, or Firm*—Frommer Lawrence & Haug LLP; William S. Frommer

[57] ABSTRACT

A disk cartridge is formed with a slidably mounted metallic shutter for opening and closing a disk access opening formed in the cartridge shell. A stock roll material for forming the shutter is formed of a sheet of metallic base material, such as aluminum, to which upper and lower film layer are applied. The upper film layer is formed of synthetic resin including a lubricant component and a coloring agent while the lower film layer is formed of a synthetic resin which is harder than that of the first film layer and to which no lubricant or coloring is added. The stock material is introduced to punching and bending processing apparatus such that the upper lubricant containing film layer contacts the punch die such that press oil need not be used during fabrication. Bending processing is carried out such that a U-shaped shutter is formed having the lubricant containing film layer at an inner surface thereof, and the harder lower film layer forms the outer surface. Thus, the outer surface resists abrasion and flawing and may be printed upon with good results, while the inner lubricated layer assures smooth sliding of the shutter and eliminates the need for applying and removing press oil during manufacture. The color applied to the lubricated film layer assures that the stock may always be correctly oriented at the initial stage of processing.

9 Claims, 4 Drawing Sheets

DISK CARTRIDGE WITH SHUTTER AND STOCK ROLL THEREFOR

FIELD OF THE INVENTION

The present invention relates to a disk cartridge. Specifically, the present invention relates to a stock roll for facilitating manufacture of a shutter for disk cartridges which rotatably house therein a disk media for storage or retrieval of computer data or the like.

DESCRIPTION OF THE RELATED ART

Disk cartridges for storage and retrieval of computer data and the like, such as a 3.5 inch floppy disk cartridge, for example, are well known. A typical structure for such a disk cartridge may be such as shown in FIG. 1 which shows a perspective view of a disk cartridge structure including a metallic shutter 105. As may be seen the disk cartridge 101 includes a rotatable disk 102 formed, for example, of a magnetic recording media, a disk shell 103 being formed with a disk access opening 104 over which the shutter 105 is slidably mounted. The shutter 105 is substantially U-shaped and includes side portions 106, 107 connected at one end be an edge portion 110 at first and second perpendicular bends 108, 109. As may be seen in the drawing, such a disk cartridge includes a metallic shutter portion slidably mounted on the cartridge casing for opening and closing an opening for access to the disk surface. Such a shutter portion may be formed of stainless steel, aluminum with alumite treatment or aluminium coated with a synthetic resin in place of aluminite treatment.

When a stock roll of such material is processed through a punch press for manufacturing shutter portions for disk cartridges, press oil is applied to an upper surface thereof for facilitating suitable 'bite' of an upper die for forming the shutters such that the material of the stock roll is sheared to form a punched plate. After, punch processing of the stock roll material, the punched stock is subjected to bending processing to form the final U-shaped structure of the disk cartridge shutter.

However, during manufacture of disk cartridge shutters according to the above process, several drawbacks are encountered. First, stainless steel shutters mean that a disk weight cannot be reduced beyond a certain degree, thwarting manufacturers efforts to provide as lightweight a product as possible. In the case of aluminum shutters with alumite treatment, a disk weight can be favorably reduced however, costs for producing the shutters are raised significantly. Further, when aluminum coated with synthetic resin is substituted for aluminum with alumite treatment the costs of the stock roll may be reduced, however, such material requires that press oil be used for assuring clean results during processing. Consequently, it becomes necessary to clean residue left from the press oil after punching. Thus, costs are again raised and processing steps are increased.

It has been considered to provide a lubricant within the synthetic resin layer for allowing resin coated aluminium to be utilized without need of applying press oil, however, according to this, the strength of the resin layer is reduced and becomes more susceptible to flaws during processing. Also, printability of such a lubricant impregnated resin layer is unsuitable from a manufacturers standpoint.

It has therefore been required to address the above problems and provide a low cost, lightweight and readily processed stock roll for disk cartridge shutters which resists flawing and is easily printed upon.

SUMMARY OF THE INVENTION

Thus, it is an object of the present invention to overcome the drawbacks of the related art.

It is a further object of the invention to provide a low cost, lightweight and readily processed stock roll for disk cartridge shutters which resists flawing and is easily printed upon.

It is another object of the invention to provide a disk cartridge having a slidable metallic shutter which assures smooth operation and high quality surface finish to which durable printing may be applied.

According to one aspect of the invention, there is provided a stock roll material for forming of disk cartridge shutters, comprising: a sheet of a metallic base material; a first film layer formed of a first treated compound including a synthetic resin and a lubricant component, applied on one side of the sheet; and, a second film layer of a second untreated compound formed of a synthetic resin having a surface hardness greater than the first film layer, applied on another side of the sheet opposite the one side.

In addition, according to another aspect of the invention, there is provided a method of forming a U-shaped, metallic shutter to be slidably mounted on a disk cartridge, comprising the steps of: applying a first film layer including a synthetic resin with a lubricant component, to a first surface of a sheet of a metallic base material; applying a second film layer formed of a synthetic resin without the lubricant component to a second surface of the sheet of metallic base material opposite the first surface, the second film layer having a surface hardness greater than the first film layer; punch processing the sheet of metallic base material including the first and second film layers by introducing the sheet to a punching apparatus for forming a punched plate, the sheet being oriented such that the first film layer faces a punching member of the punching apparatus for lubricating a contact surface of the metallic base material during the punch processing; and bending the punched plate via a bending processing apparatus into a U-shaped configuration for forming the shutter, the punched plate being arranged at the bending apparatus such that the first film layer having the lubricant component forms an inner surface of the U-shaped shutter and the second film layer having the greater surface hardness forms an outer surface thereof.

Also, according to a further aspect of the invention, there is provided a disk cartridge including a slidably mounted metallic shutter comprising: a cartridge casing including an upper shell and a lower shell, the upper and lower shells including recessed areas for slidably mounting the shutter, a disk access opening being defined through the upper and lower shells within the recessed areas; a disk formed of a recording medium material rotatably mounted between the upper and lower shells; upper and lower liner portions respectively interposed between upper and lower surfaces of the disk and inner surfaces of the upper and lower shells; a shutter slidably mounted astride the upper and lower shells within the recessed areas, the shutter having windows formed on each side thereof being movable according to sliding movement of the shutter to be positioned so as to correspond to the disk access openings formed in the upper and lower shells for exposing upper and lower surfaces of the disk for effecting reading or writing operation to or from the disk; wherein: the shutter is formed of a sheet of a metallic sheet material formed by bending into a U-shaped configuration, the shutter having a first film layer of synthetic resin including a lubricant component formed on an inner surface thereof and a second film layer formed of a synthetic resin only, having a surface hardness greater than the first film layer, formed on an outer surface thereof.

DESCRIPTION OF THE PREFERRED EMBODIMENT

Hereinbelow, a preferred embodiment of the invention will be explained in detail with reference to the drawings.

Figure 1:
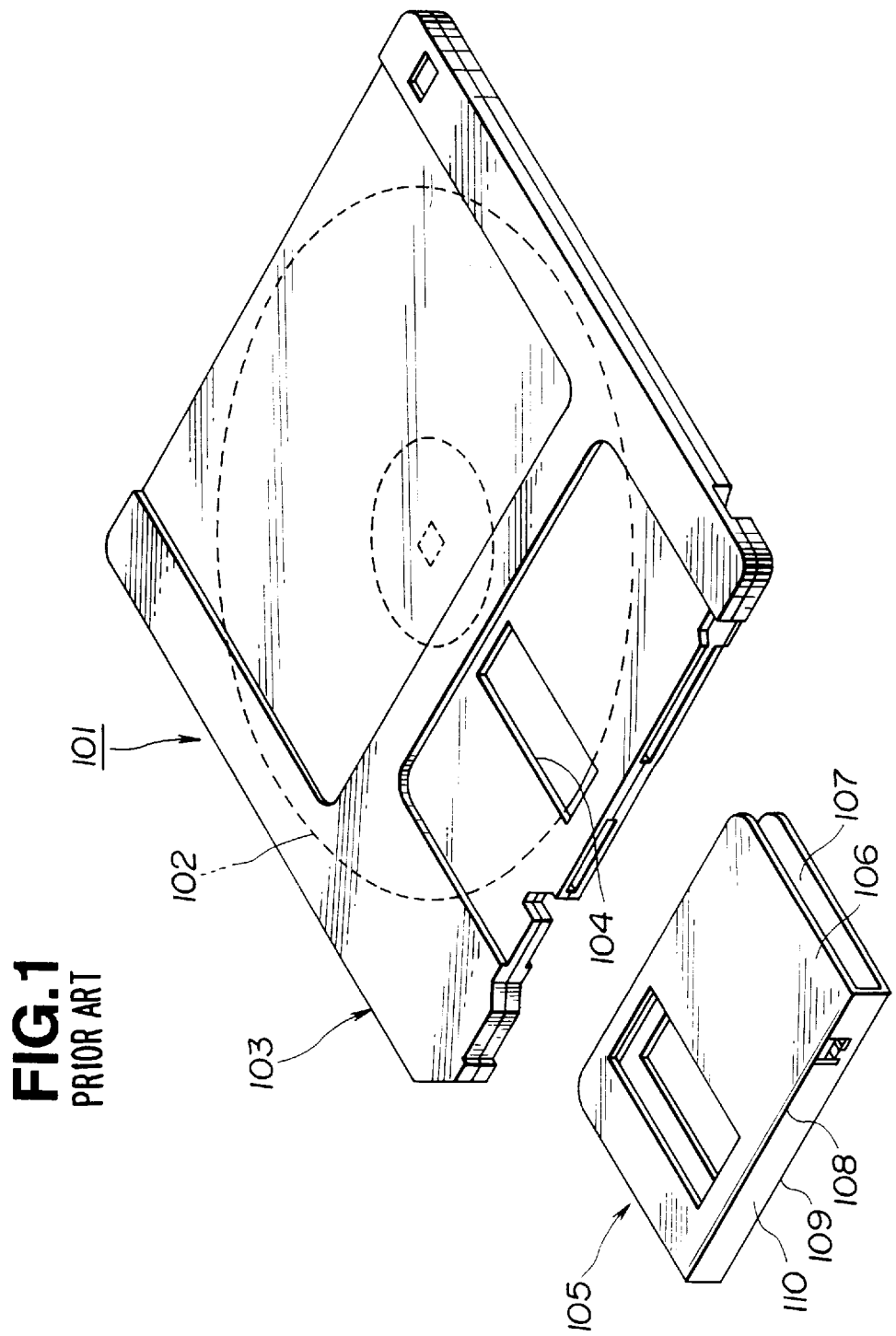
FIG. 1 is a perspective view showing the structural components of a disk cartridge.
Figure 2:
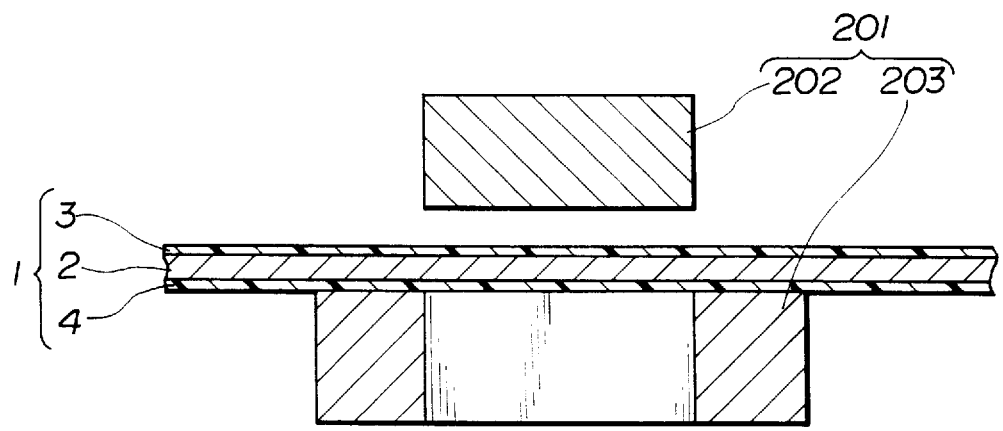
FIG. 2 is a cross-sectional view of a stock roll of shutter material according to the invention, during a punch processing step for manufacture of a disk shutter.

Referring to FIG. 2, a section of a roll of shutter stock 1 according to the invention is shown in position for punch processing. As may be seen, the shutter stock 1 according to the invention is formed in a layered configuration. According to the present embodiment, the shutter stock is based on a metallic layer 2 formed of aluminum. The metallic layer 2 has upper and lower surfaces respectively coated with an upper lubricant containing synthetic resin layer 3 (hereinbelow: lubricant containing layer 3) and a lower plain resin layer 4 (hereinbelow: non-lubricant containing layer 4) formed of synthetic resin to which lubricant has not been added. Further, according to the present embodiment, the lubricant containing layer 3 is formed with a colored tint while the non-lubricant containing layer 4 is formed without coloration (i.e. transparent).

The lubricant containing layer 3 is formed of a granular wax having a grain diameter of substantially 1 μm uniformly dispersed in a urethane system resin. This composite is evenly applied on the top surface of the metallic layer 2 and treated by heat hardening processing to form a coating film having a thickness of approximately 1 μm.

Compared to the above lubricant containing layer 3, the non-lubricant containing layer 4 is formed as a resin film having substantially high strength (hardness), based on an epoxy system resin, or the like, which is applied to the lower surface of the metallic layer 2 and processed by heat hardening to form a resin film having a thickness of approximately 2 μm.

A roll of shutter stock 1 formed as described above is fed into a punch processing apparatus 201 including an upper die 202 and a lower die 203. According to the present embodiment, the shutter stock is fed into the punch processing apparatus 201 such that the lubricant containing layer 3 is faced upward to be contacted by the upper die 202 while the non-lubricant containing layer 4 is faced downward to contact the lower die 203. The upper die 202 punches the shutter stock 1 via the lubricant containing layer 3 to form a punched plate 5 of predesigned shape and dimensions as shown in FIG. 3.

Figure 3:
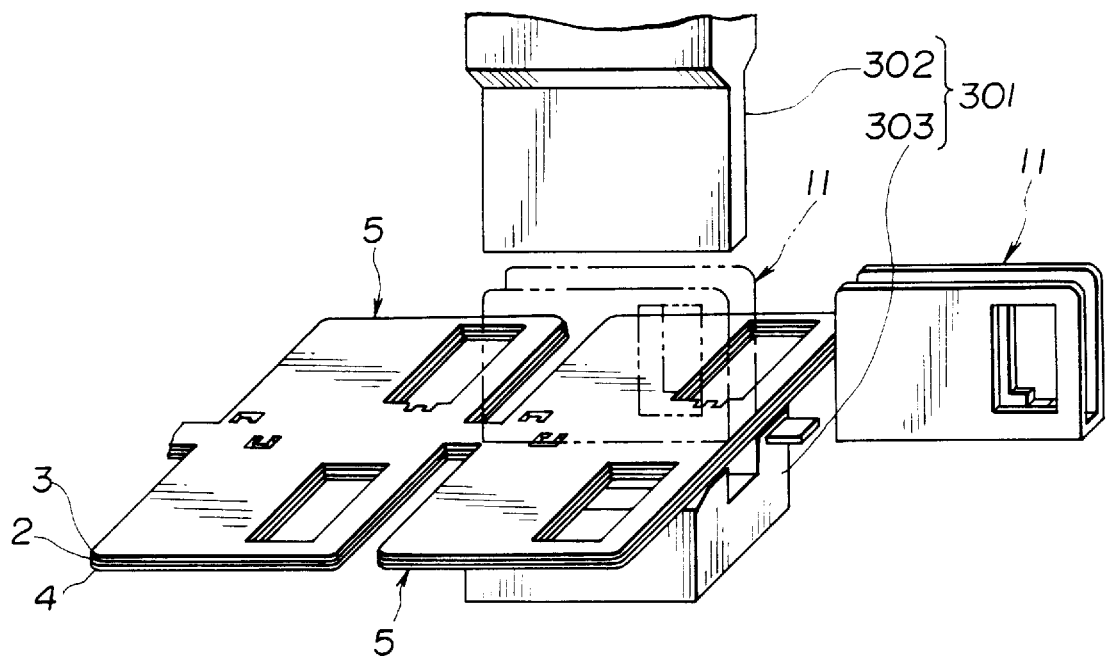
FIG. 3 is a perspective view of a bending processing step in the fabrication of a disk shutter according to the invention.

As may also be seen in FIG. 3, the punched plate 5 is then fed into a bending processing apparatus 301 including an upper punch 302 and a lower die 303. The bending processing apparatus is active to bend the punched plate 5 into a U-shaped configuration for forming a completed disk cartridge shutter.

Figure 4:
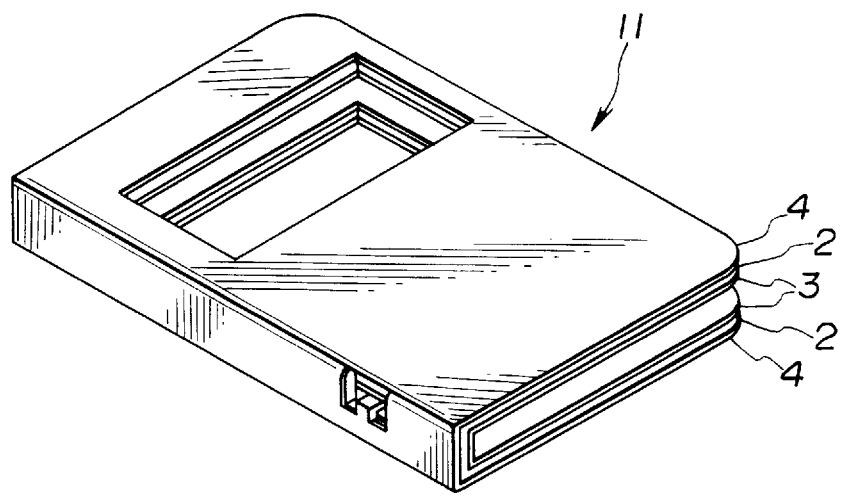
FIG. 4 is a perspective view of a completed shutter formed of stock roll material according to the invention.
Figure 5:
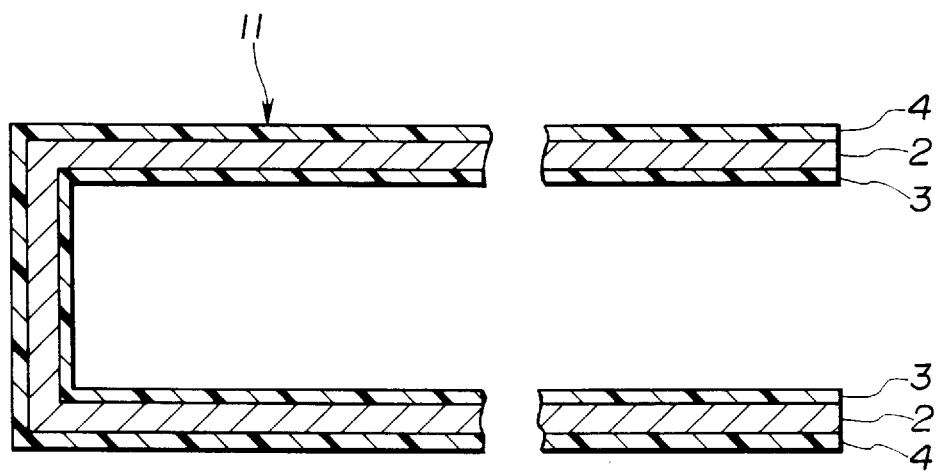
FIG. 5 is a cross-sectional view of the completed shutter of FIG. 4.

According to the invention, the upper punch 302 is contacted with the upper surface of the punched plate 5 which is coated with the lubricant containing layer 3 the same as the shutter stock 1. The bending processing apparatus is arranged such that, after carrying out of bending processing, the punched plate is formed into a U-shaped shutter 11, the inside surface of which is covered by the lubricant containing layer 3 and having a protective layer of the non-lubricant containing layer 4 on an outer surface thereof, as seen in FIGS. 4 and 5.

Figure 6:
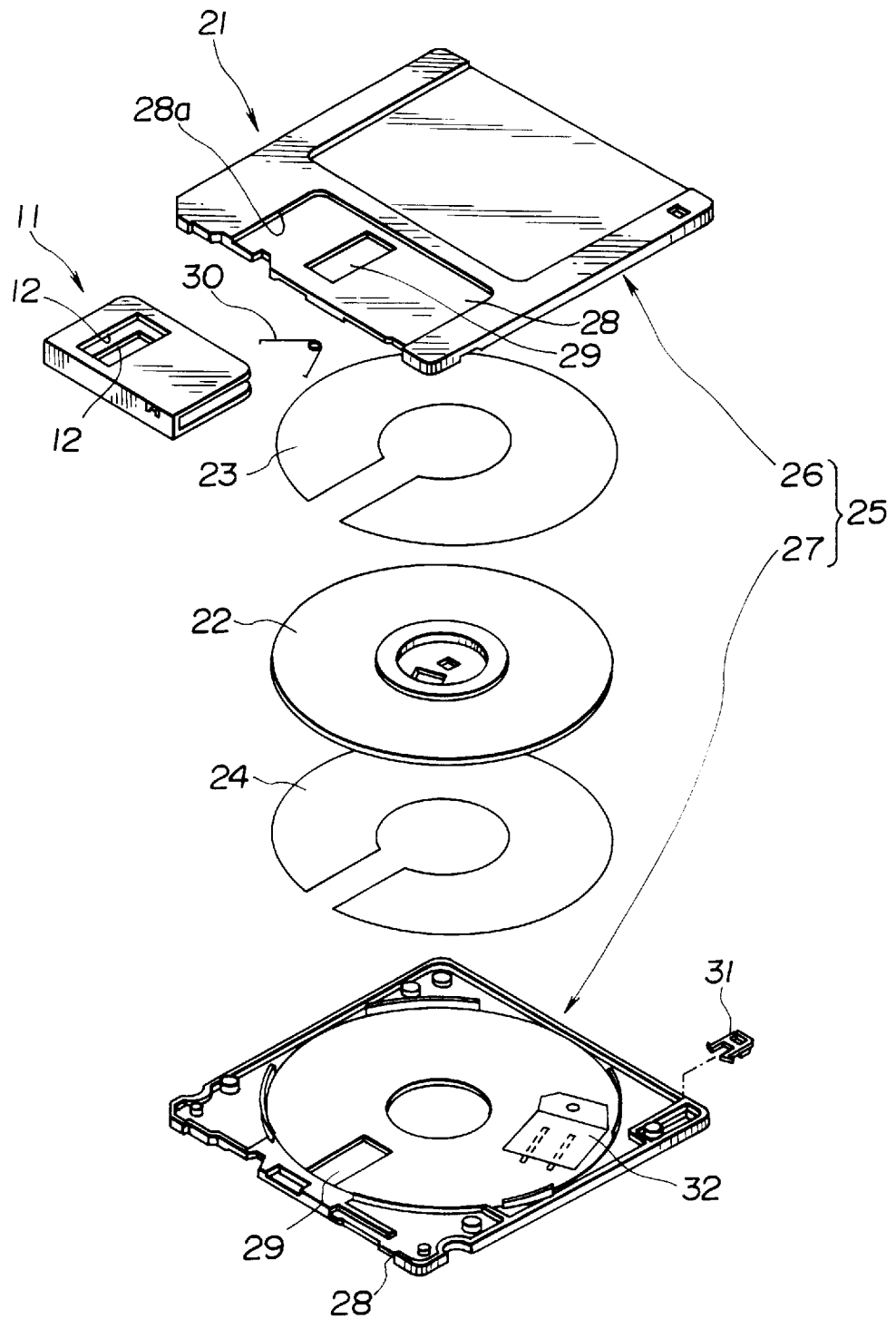
FIG. 6 shows an exploded perspective view of a complete disk cartridge structure utilizing the shutter according to the invention.

Referring now to FIG. 6, a 3.5 inch floppy disk cartridge formed with a shutter according to the invention is shown. As may be seen in the drawing, the disk cartridge according to the invention includes a disk 22 formed of a recording medium which is rotatably mounted in a casing 25. The casing 25 includes an upper shell 26 and a lower shell 27. The disk 22 is mounted between the upper and lower shells 26, 27 with upper and lower liners 23, 24 interposed between the surface of the disk 22 and the inner surface of the upper and lower shells 26, 27. The upper and lower shells 26, 27 further include a recessed portion 28 for slidably mounting the shutter 11. The recessed portions 28 of the upper and lower shells 26, 27 further have a disk access opening 29 defined therethrough for allowing a head of a disk drive to write to and read from the disk 22. An edge 28a of the recessed portion 28 allows a thickness of the shutter stock 1 forming the shutter 11 to be snugly recessed in the outer surface of the casing 25, slidably mounted via a shutter spring 30. Sliding movement of the shutter 11 when mounted on the casing 25, permits windows 12, 12 formed on each side of the shutter 11 to be positioned so as to correspond to the disk access openings 29, 29 formed in the upper and lower shells 26, 27 exposing the surfaces of the disk 22 during use. Further, an erasure prevention member 31 and a lifter 32 are provided on the lower shell 27.

Hereinbelow, the function and effects of the disk cartridge of the invention utilizing the shutter 11 formed of the shutter stock 1 as set forth above will be described in detail.

First of all, during manufacture, the shutter stock according to the invention may always be correctly set for shutter processing since the lubricant containing layer 3 and the non-lubricant containing layer 4 are distinguished by color. That is, the upper lubricant containing layer 3 includes a colored tint while the non-lubricant containing layer 4 is uncolored. Alteratively, both layers may be tinted in different colors.

In addition, since the lubricant containing layer 3 is faced upward to contact the upper die 202 of the punching apparatus 201, high quality punch processing of the shutter stock 1 may be reliably assured without need for using press oil, thus costs and processing steps may be reduced.

Further, since the shutter 11 formed according to the invention has the lubricant containing layer 3 at the inner surface of the U-shape and the high-hardness non-lubricant containing layer 4 at the outer surface thereof, printing is carried out on the outer non-lubricant containing layer 4. Accordingly, the best printing results can be obtained even while the need for use of press oil is eliminated.

It will also be appreciated that the high hardness of the non-lubricant containing layer 4 assures that the outer surface of the shutter 11 will resist abrasion and flawing and present a clean appearance while clean shearing of the shutter stock 1 is obtained.

Referring to Table 1 below, the results of film adhesion, abrasion resistance, strength to pencil, surface wettability, and strength of printing tests are shown comparing the characteristics of the inner and outer surfaces (i.e. the lubricant containing layer 3 and the non-lubricant containing layer 4) of the shutter 11 according to the invention.

TABLE 1

| TESTED SURFACE FILM MATERIAL | INNER SURFACE (3) urethane system resin w/ granular wax kneading | OUTER SURFACE (4) epoxy system resin |
|---|---|---|
| FILM THICKNESS | 1 μm | 2 μm |
| FILM ADHESION | 92/1000 | 100/100 |
| ABRASION RESISTANCE | 70X | 100X |
| STRENGTH TO PENCIL | 4H | 9H |
| SURFACE WETTABILITY | 43 (dyne/cm) | more than 54 (dyne/cm) |
| STRENGTH OF PRINTING | fairly weak | good |

In testing according to the above table, film adhesion was measured by sectioning areas of the inner and outer film layers (lubricant containing layer 3 and the non-lubricant containing layer 4) into 1 μm squares by cutting with a cutter knife and applying a strip of adhesive cellophane tape over the sectioned area. The adhesive tape was then lifted and the number of squares which were lifted and adhered to the tape were counted.

Abrasion resistance was measured by rubbing the film surface with a rubber eraser with an applied force of 500 g and measuring the time before the onset of surface abrasion.

Strength to pencil was measured according to the standards of JIS-K5400.

Surface wettability was determined by applying a standard test solution on the film surface and evaluating shrinkage of the film layer.

Strength of printing was measured by mixing VIC ink manufactured by Seiko Advance Co. at 8 percent by weight with a specified setting agent, printing the ink on the film layers via silk screen technique, drying for two minutes at 60° C., applying adhesive tape over the printed area then lifting the adhered tape off the printed area and visually evaluating the results.

It will be noted that the shutter stock 1 according to the invention may also be preferrably employed for forming shutter for disks other than standard 3.5 inch floppy disks, other types such as magneto-optical disks, etc., may also benefit from the shutter of the invention.

Further, it will be noted that, in addition to the other effects and advantages of the invention as noted above, since the lubricant containing layer 3 is finally provided on the inner surface of a U-shaped shutter 11, friction between the inner surface of the shutter and the disk casing 25 is reduced. Thus the shutter 11 opens more smoothly and sticking or jamming of the shutter mechanism is prevented.

Also, since no press oil is used, washing processing to remove oil residue is not required. Thus environmentally harmful solvents, such as trichloroethylene, which are commonly used for such washing processing, are permanently removed from the manufacturing process.

Thus, according to the present invention as described herein above, there is provided a disk cartridge including a metallic shutter and stock roll material therefor which has all sought for advantages over conventional structures.

It will be noted that, although the preferred embodiment is set forth in terms of a U-shaped shutter for a floppy disk cartridge, the present invention may be embodied in various different ways without departing from the principle of the invention as herein set forth.

The present invention is not limited only to the description as herein disclosed but may be modified and embodied in other ways without departing from the scope or inventive concept of the invention as set forth above.

What is claimed is:

1. A stock roll material for forming disk cartridge shutters, comprising:

a sheet of a metallic base material;

a first film layer formed of a first treated compound including a synthetic resin and a lubricant component, applied on one side of said sheet wherein said first treated compound of said first film layer comprises a granular wax having a grain diameter of substantially 1 μm uniformly dispersed in a urethane resin, being evenly applied on a top surface of said sheet of metallic base material and processed by heat hardening to form said first film layer with a thickness of approximately 1 μm; and a second film layer of a second untreated compound formed of a synthetic resin having a surface hardness greater than said first film layer, applied on another side of said sheet opposite said one side wherein said second untreated compound of said second film layer comprises an epoxy resin applied to a lower surface of said sheet of metallic base material and processed by heat hardening to form said second film layer with a thickness of approximately 2 μm.

2. A stock roll material for forming disk cartridge shutters as set forth in claim 1, wherein said metallic base material is aluminum.

3. A stock roll material for forming disk cartridge shutters as set forth in claim 1, wherein said first film layer further includes a coloring component such that a surface color thereof is different from that of said second film layer.

4. A method of forming a U-shaped, metallic shutter to be slidably mounted on a disk cartridge, comprising the steps of:

applying a first film layer including a synthetic resin with a lubricant component, to a first surface of a sheet of a metallic base material wherein said first film layer comprises a granular wax having a train diameter of substantially 1 μm uniformly dispersed in a urethane resin, being evenly applied in a top surface of said sheet of metallic base material and processed by heat hardening to form said first film layer with a thickness of approximately 1 μm;

applying a second film layer formed of a synthetic resin without said lubricant component to a second surface of said sheet of metallic base material opposite said first surface, said second film layer having a surface hardness greater than said first film layer wherein said second film layer comprises an epoxy resin applied to a lower surface of said sheet of metallic base material and processed by heat hardening to form said second film layer with a thickness of approximately 2 μm;

punch processing said sheet of metallic base material including said first and second film layers by introducing said sheet to a punching apparatus for forming a punched plate, said sheet being oriented such that said first film layer faces a punching member of said punching apparatus for lubricating a contract surface of said metallic base material during said punch processing; and bending said punched plate via a bending processing apparatus into a U-shaped configuration for forming said shutter, said punched plate being arranged at said bending apparatus such that said first film layer having said lubricant component forms an inner surface of said U-shaped shutter and said second film layer having said greater surface hardness forms an outer surface thereof.

5. A method of forming a shutter for a disk cartridge as set forth in claim 4, wherein said first film layer further includes a coloring component such that a surface color thereof is different from that of said second film layer.

6. A method of forming a shutter for a disk cartridge as set forth in claim 4, wherein said metallic base material is aluminum.

7. A disk cartridge including a slidably mounted metallic shutter comprising:

a cartridge casing including an upper shell and a lower shell, said upper and lower shells including recessed areas for slidably mounting said shutter, a disk access opening being defined through said upper and lower shells within said recessed areas;

a disk formed of a recording medium material rotatably mounted between said upper and lower shells;

upper and lower liner portions respectively interposed between upper and lower surfaces of said disk and inner surfaces of said upper and lower shells;

a shutter slidably mounted astride said upper and lower shells within said recessed areas, said shutter having windows formed on each side thereof being movable according to sliding movement of said shutter to be positioned so as to correspond to said disk access openings formed in said upper and lower shells for exposing upper and lower surfaces of said disk for effecting reading or writing operation to or from said disk; wherein:

said shutter is formed of a sheet of a metallic sheet material formed by bending into a U-shaped configuration, said shutter having a first film layer of synthetic resin including a lubricant component formed on an inner surface thereof and a second film layer formed of a synthetic resin only, having a surface hardness greater than said first film layer, formed on an outer surface thereof, wherein said first film layer comprises a granular wax having a train diameter of substantially 1 $\mu$m uniformly dispersed in a urethane resin, being evenly applied and processed by heat hardening to form said first film layer with a thickness of approximately 1 $\mu$m, and said second film layer is formed of an epoxy resin applied to said metallic sheet material and processed by heat hardening to form said second film layer with a thickness of approximately 2 $\mu$m.

8. A disk cartridge as set forth in claim 7, wherein said first film layer further includes a coloring component such that a surface color thereof is different from that of said second film layer.

9. A disk cartridge as set forth in claim 7, wherein said metallic sheet material is aluminum.

* * * * *